United States Patent
Heidenreich et al.

(10) Patent No.: US 11,293,409 B2
(45) Date of Patent: Apr. 5, 2022

(54) WIND TURBINE COUPLING TO MITIGATE TORQUE REVERSALS

(71) Applicant: AeroTorque Corporation, Wadsworth, OH (US)

(72) Inventors: David C. Heidenreich, Akron, OH (US); Richard E. Cole, Jr., LaGrange, OH (US); Dustin J. Sadler, Rittman, OH (US)

(73) Assignee: PT Tech, LLC, Wadsworth, OH (US)

( * ) Notice: Subject to any disclaimer, the term of this patent is extended or adjusted under 35 U.S.C. 154(b) by 0 days.

(21) Appl. No.: 16/547,915

(22) Filed: Aug. 22, 2019

(65) Prior Publication Data

US 2019/0376492 A1   Dec. 12, 2019

Related U.S. Application Data

(62) Division of application No. 14/787,375, filed as application No. PCT/US2014/057590 on Sep. 26, 2014, now Pat. No. 10,458,395.

(60) Provisional application No. 61/882,856, filed on Sep. 26, 2013.

(51) Int. Cl.
| | |
|---|---|
| *F03D 15/00* | (2016.01) |
| *F03D 15/10* | (2016.01) |
| *F03D 1/00* | (2006.01) |
| *F16D 7/02* | (2006.01) |
| *F03D 9/25* | (2016.01) |
| *F16F 15/123* | (2006.01) |
| *F03D 7/02* | (2006.01) |
| *F16F 15/129* | (2006.01) |

(52) U.S. Cl.
CPC ............. *F03D 15/10* (2016.05); *F03D 1/00* (2013.01); *F03D 7/0296* (2013.01); *F03D 9/25* (2016.05); *F03D 15/00* (2016.05); *F16D 7/025* (2013.01); *F16F 15/123* (2013.01); *F16F 15/1297* (2013.01); *F05B 2260/4023* (2013.01); *Y02E 10/72* (2013.01)

(58) Field of Classification Search
CPC .......... F03D 15/10; F03D 9/25; F03D 7/0296; F03D 1/00; F05B 2260/4023; F16F 15/123; F16F 15/127; F16D 7/025
See application file for complete search history.

(56) References Cited

U.S. PATENT DOCUMENTS

2012/0201679 A1\*  8/2012  Heidenreich ........... F03D 15/00
                                                                      416/146 R \* cited by examiner

*Primary Examiner* — David E Sosnowski
*Assistant Examiner* — Maxime M Adjagbe
(74) *Attorney, Agent, or Firm* — Renner, Kenner, Greive, Bobak, Taylor & Weber Co., L.P.A.

(57) ABSTRACT

A wind turbine power generating system, including a wind turbine connected to a speed-increasing gearbox having an output shaft. An electrical generator having an input shaft is also provided. A coupling interconnects the input and output shafts. The coupling includes a high torsional wind-up and/or displacement ability in parallel with a high frictional slip ability, such that during normal operation there is little or no frictional slippage and during a transient torque reversal the loads in the turbine drive system are decreased, thus decreasing the impact loads on the gearbox bearings.

19 Claims, 11 Drawing Sheets

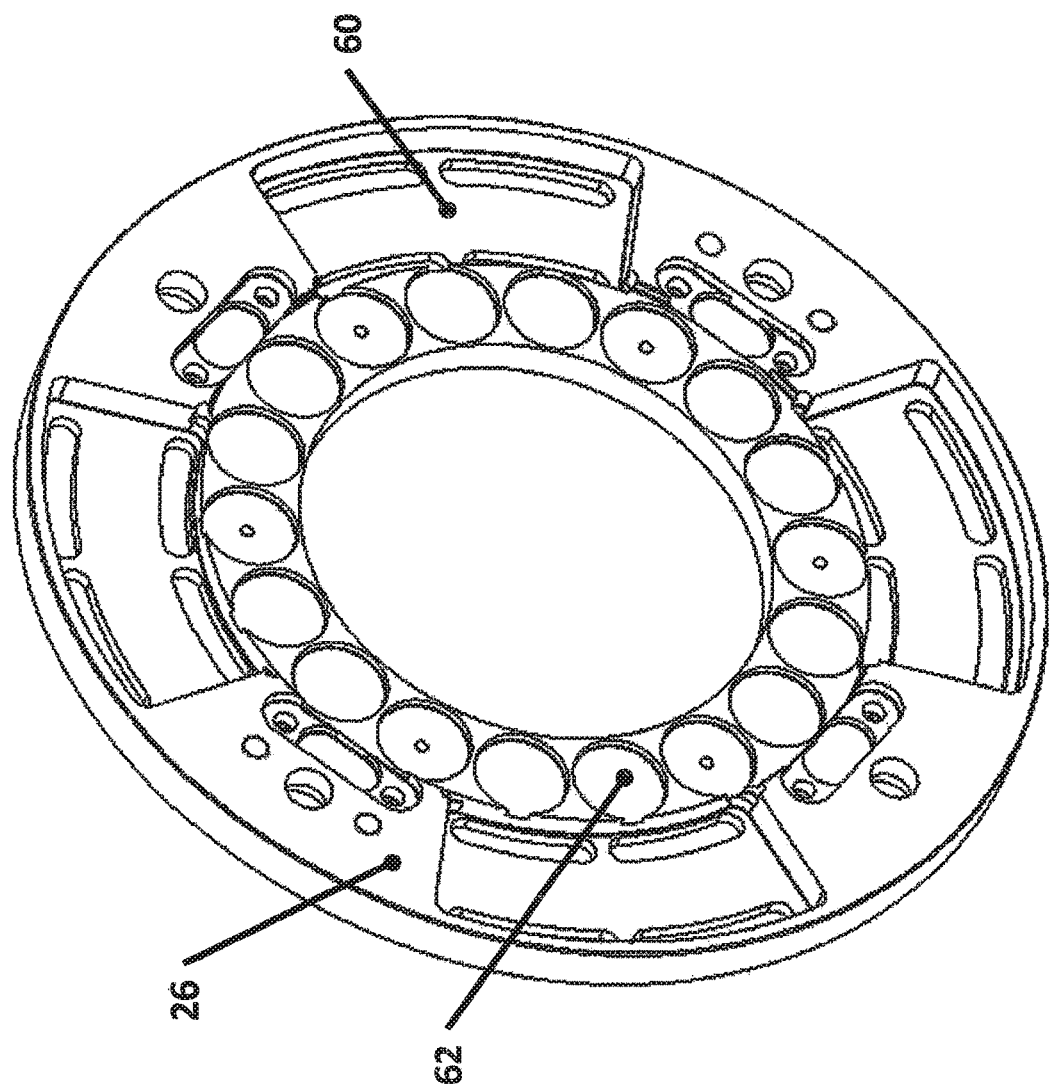

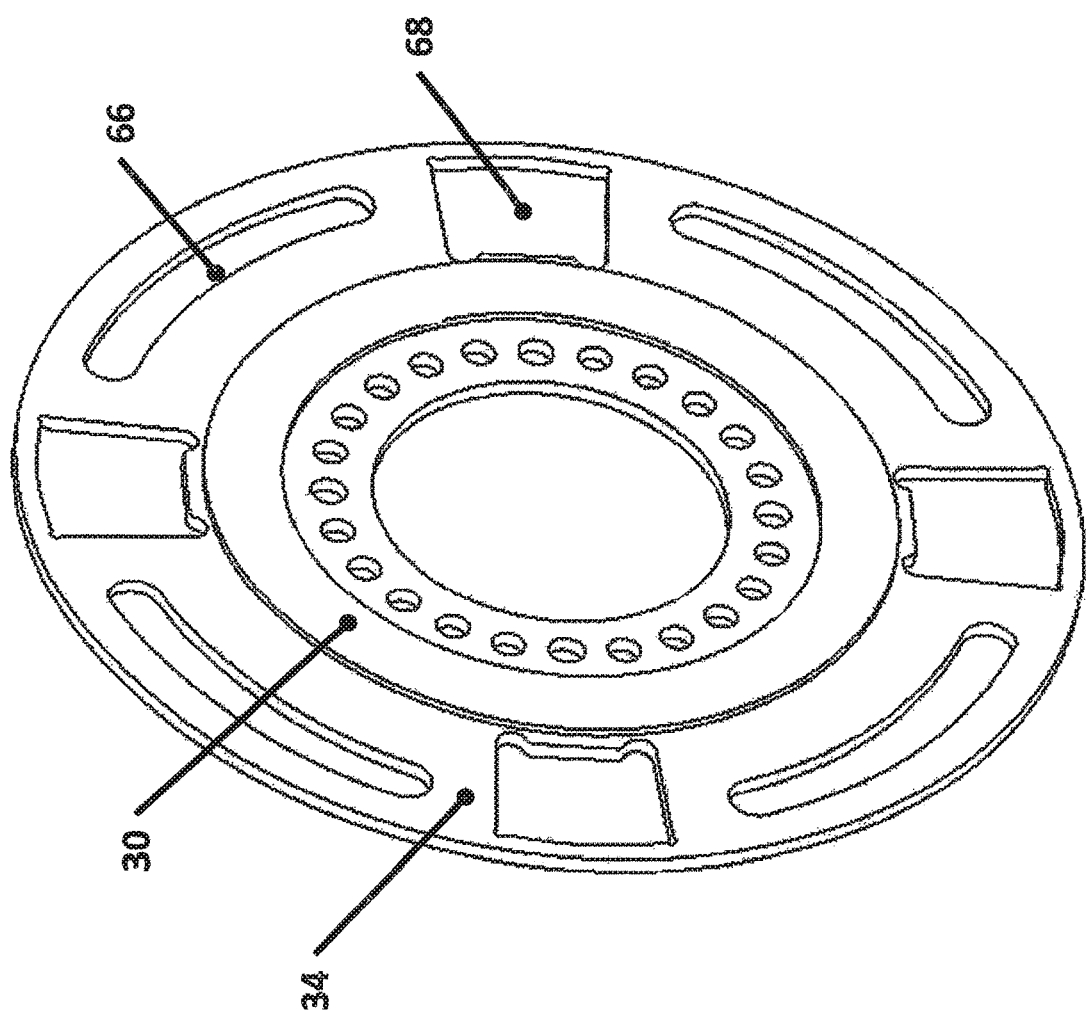

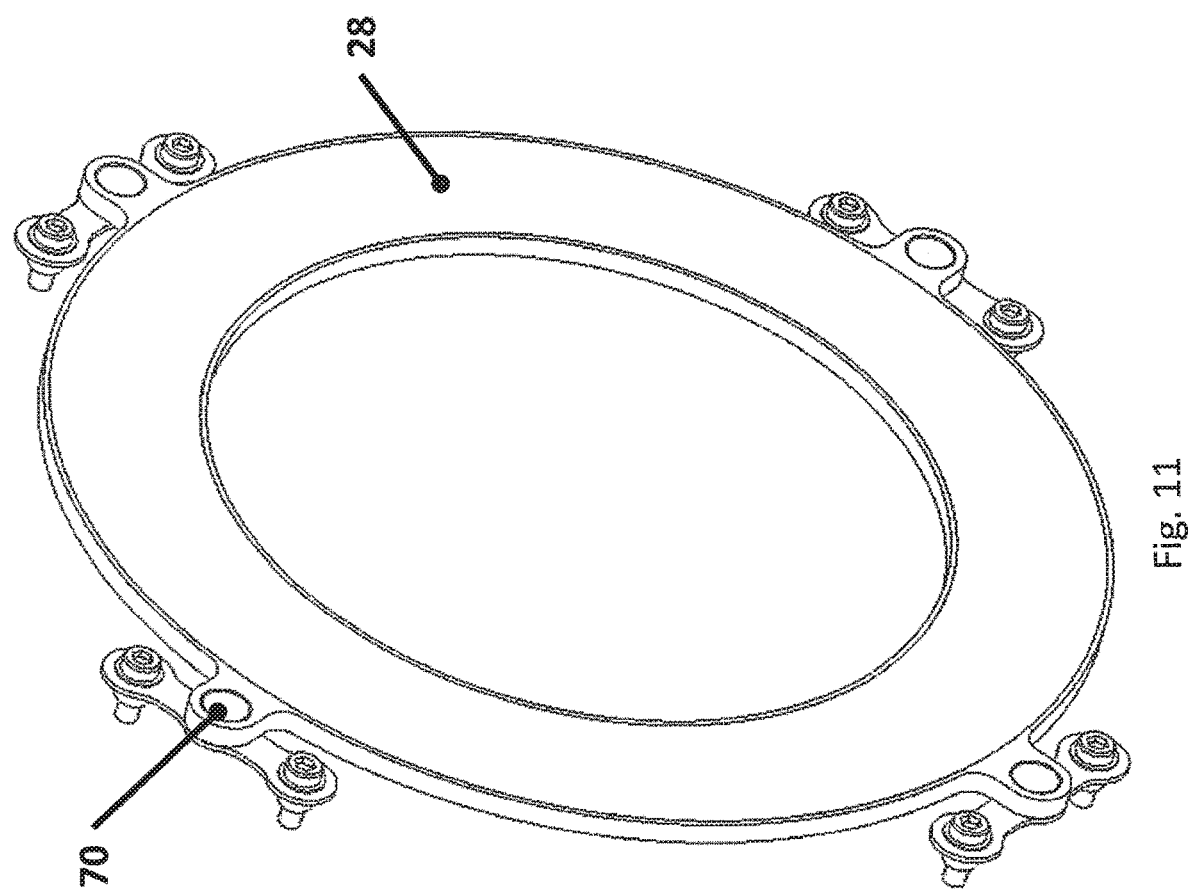

WIND TURBINE COUPLING TO MITIGATE TORQUE REVERSALS

CROSS-REFERENCE TO RELATED APPLICATION

This is a divisional patent application of U.S. patent application Ser. No. 14/787,375, filed Oct. 27, 2015, by the same title, now U.S. Pat. No. 10,458,395, which is a 371 national phase application of International PCT application PCT/US14/57590, filed Sep. 26, 2014, by the same title, now expired, which application claims the benefit of U.S. provisional application Ser. No. 61/882,856, filed Sep. 26, 2013, by the same title, which is fully incorporated herein by reference.

TECHNICAL FIELD

The invention herein relates to couplings interposed between wind turbines and electrical generators. Particularly, the invention relates to such a coupling configured to dissipate the adverse effects of torque reversals on gearbox bearings in a wind turbine generator system.

BACKGROUND ART

Well over 100,000 megawatt and multi-megawatt wind turbines have been installed over the past decade, almost all using a similar drive system incorporating a gearbox as a speed increaser, positioned between the turbine blades and the generator. The gearboxes are designed for 20-year life, but typically need repair or replacement in 5 to 10 years or less. Axial cracking of gearbox bearings is becoming a major cost factor in the return on investment of wind farms. Impact loading during transient torque reversals has been recognized as a root cause of this damage. Recently research has shown that an unusual mode of bearing damage called White Etch Area (WEA) damage is causing the axial cracking of the bearings. WEA damage is actually a microscopic material alteration that creates super-hard inclusions like slivers just below the bearing raceway where cracks can initiate and grow. Severe and rapid microscopic plastic deformation is suspected as the cause of WEA damage.

During a torque reversal, the load zone of the gearbox bearings suddenly shifts 180 degrees. The bearing rollers radially impact onto the raceway along with a simultaneous high axial load reversal from the helical gears. Both the magnitude and the rate of the impact loads and axial surface traction loads determine the potential for WEA plastic deformation in the bearing inner race. The higher the torsional natural frequency of the drive train's spring mass system, the greater the torque rate of change, and thus the higher the strain rate as the rollers impact the bearing inner race. As wind turbines have increased in size, the high strain rate during rapid bearing load zone reversals, along with high impact stress, appears to be exceeding a threshold where WEA damage is initiated in the bearing inner raceway. Once initiated the normal roller loading can cause axial cracking and bearing failures in as little as a year or two.

In a wind turbine generator system, high inertia characterizes the entire system, from the turbine blades, main shaft, gearbox high-speed coupling and into the generator itself. Indeed, the highest inertia is typically at the opposite ends of the system—at the blades and the generator. On torque reversal, the high inertia of the system can significantly impact all of the system components, and particularly the gearbox. The asymmetric torque-limiting clutch system described in U.S. Patent Application Publication US 2012/045335 A1 describes a solution to this problem. An alternate solution contemplates increasing the torsional wind-up of the system (including certain of, blades, a main shaft, a gearbox, a high-speed shaft/coupling and a generator) which would lower the natural frequency. If this were done alone, it could cause other problems in the turbine drive system; such as resonant frequency issues in other parts of the turbine. For instance, it is known that the coupling spacer between the gearbox and the generator can have a problematic axial natural frequency that can cause spacer element resonance and destruction. Any changes to the system natural frequency during normal operation may necessitate a recertification of the turbine.

Increasing the torsional wind-up must be done in a way that does not affect normal operation of the turbine. This could be accomplished with a high frictional slip ability in parallel with a high torsional wind-up and/or displacement ability. For example, if the frictional torque setting was at 40% of the rated turbine torque, there would be no slippage during normal operation between 20% and 100% of the rated turbine torque as apparent from FIG. 1. The only time the friction slippage would occur is when the drive system sees a total torque variation exceeding 80% of the rated turbine torque, for example for brief periods during startups and shutdowns. Significant slippage would only occur during rare system transient torque reversals exceeding the frictional slip setting. It is contemplated that the frictional torque setting should be such as to accommodate some small slippage during normal startup and shutdown operation to keep the friction surfaces clean and free of corrosion.

If the high torsional wind-up is effected by a torsional spring, as contemplated in an embodiment of the invention, the torsional spring rate may be asymmetric so that the spring rate in reverse could be lower or near zero for a portion of the displacement. Any reverse torque events would slip at frictional resistance only of say 40% of normal turbine torque. The reverse angle of travel would need to be sufficient to absorb reverse transient wind-up energy of the drive system. This may require a torsional movement of 10 to 50 degrees or greater for typical turbines with generators operating at 1000 rpm or more. For turbines with lower generator operating speeds, the required torsional displacement would be lower, in the range of 1 to 5 degrees per 100 rpm.

The typical coupling systems of existing wind turbines are designed with significant parallel, angular and axial shaft misalignment capability between the gearbox and the generator in order to accommodate the flexing of the lightweight base plate structure. These coupling systems typically have zero backlash and are torsionally very rigid with very little wind-up ability. The torsional characteristics are critically important to preventing resonant vibration problems in the drive system and turbine components. Some coupling systems are equipped with frictional torque limiters set at 150 to 200% of the rated turbine torque. They are intended to protect the coupling from the very high torque overloads such as generator short circuits. These torque limiters have proved to be ineffective in protecting the drive system and especially the gearbox from transient torque reversals whose impact loads on the gearbox bearings can dramatically shorten life.

Coupling systems that utilize torsional wind-up in parallel with low frictional damping, such as Spaetgens U.S. Pat. No. 2,909,911 and Lech U.S. Pat. No. 4,548,311, have been around for a long time. They are generally used on internal combustion engines. Their torsional wind-up ability is used to tune the natural frequencies of the system to be outside the operating range of the equipment. Their frictional damping component that is in parallel with the torsional wind-up is typically very small and is used to control clutch plate and gear rattle noise and damage during idling and shifting. These types of couplings generally are integrated with the engine clutch whose frictional slip setting is very high and is in series with the torsional wind-up ability, not in parallel. Lech is a good example. The frictional component that is in parallel has a very low frictional slip setting.

A key to the present invention's success is a coupling system with a high torsional wind-up and/or displacement ability, along with a high frictional slip ability to dampen the system significantly only during a transient torque reversal event (see FIG. 1). A typical turbine with a high speed generator operating at 1000 to 1800 rpm would require at least 10 degrees of reverse slippage with a torque setting of at least 10% of turbine rated torque. Ideally, the reverse slippage would exceed 20 degrees at 40% reverse torque. Nowhere in the prior art is there a drive system with such a combination of torsional displacement and/or wind-up with torsional frictional damping capable of taming high torque reversals. This is certainly not true for the uniquely challenging reversals of wind turbines.

SUMMARY OF THE INVENTION

In light of the foregoing, it is a first aspect of the invention to provide an improved wind turbine coupling with an asymmetric torsional behavior in wind turbine drive systems to protect gearbox bearings from damage due to torsional reversals.

Still a further aspect of the invention is the provision of a wind turbine coupling system having very little wind-up or torsional displacement during normal operation in the forward direction and yet having significant torsional wind-up and/or displacement in the reverse direction.

Yet another aspect of the invention is the provision of a wind turbine coupling system that is readily adaptable to existing wind turbine couplings for enhanced operation and durability.

Another aspect of the invention is the provision in a wind turbine coupling system of a frictional slip capability in parallel with torsional wind-up and/or displacement.

Another aspect of the invention is the provision of a wind turbine coupling system having a frictional slip capability high enough that there is little or no slippage during normal operation.

Yet a further aspect of this invention is the provision of a wind turbine coupling system with a small amount of frictional slippage during startup to full rated torque and shutdown.

Another aspect of the invention is the provision of a wind turbine coupling having enough frictional slippage during a torque reversal to absorb the damaging energy of an impact load that might otherwise initiate axial cracking in gearbox bearings.

Yet another aspect of the invention is the provision of a wind turbine coupling that automatically resets itself to the forward operational position upon restart of the turbine to full torque.

Still a further aspect of the invention is the provision of a wind turbine coupling of a symmetrical design that is able to operate in an asymmetrical manner described above so that the device can be used for both clockwise and counterclockwise forward direction of the wind turbine generator.

The foregoing and other aspects of various embodiments of the invention, taken separately or in combination, are achieved by the improvement in a wind turbine power generating system comprising a wind turbine connected to a speed-increasing gearbox having a high-speed output shaft and an electrical generator having an input shaft, the improvement comprising: a coupling system interconnecting said output and input shafts, said coupling system having a portion of its torque path split between at least one of a torsional wind-up and displacement component along with a torsional dampening component. The torsional dampening component may be a frictional slip component set in the forward direction to at least 10% of the rated turbine torque. Similarly, the frictional slip setting in the reverse driving direction may be equal to at least 10% of the rated turbine torque. The torsional rotational displacement movement in a reverse direction may be taken from the group of at least 10 degrees or greater for turbines with generators operating at 1000 rpm or more, and for turbines with lower generated speeds in the range of 1 to 5 degrees per 100 rpm. A zero backlash connection may be provided between a pressure plate and endplate in the coupling system.

In a preferred embodiment of the invention for generator speeds exceeding 1000 rpm, the parallel wind-up and frictional slip are located on the generator shaft and an adapter plate is provided to fit the existing flexible coupling of the turbine for ease and safety of retrofitting. According to the invention, a portion of the rotational movement is frictional slip without torsional wind-up in forward or reverse and wherein the frictional slip-only portion is at least 10 degrees. It is contemplated that a hard stop is provided after a threshold of torque in a forward direction is exceeded, and that threshold is contemplated at above 120% of rated turbine torque.

The torsional movement of the coupling system has an asymmetric action during operation such that the only time a deadband is engaged is during a torque reversal exceeding a frictional slip threshold. It is particularly preferred that the asymmetric action occurs automatically and a frictional slip setting is greater than 20% of the rated turbine torque, but less than 100% thereof. The design of the frictional slip and wind-up elements are preferably symmetric to allow for use on wind turbines that have gearbox designs that may drive the generator in either clockwise or counterclockwise direction in normal forward rotation.

In operation, the coupling system is symmetrical in design and yet asymmetric in its response to torque reversals with a prolonged slip ability in either direction of shaft rotation, and the slip torque setting is high enough to only occur during transient torsional events that would typically include torque reversals and transient torque events. The torsional movement during normal startups and shutdowns is normally less than 10 degrees for generator speeds exceeding 1000 rpm, while the torsional movement during transient torque reversals exceeds 10 degrees. While a torsional spring is preferred for the wind-up action, it is also contemplated that the torsional spring may be replaced with an elastomeric material in shear, an elastomeric material in compression, metal springs in compression, metal springs in bending, and gas springs. In any event, it is desired that the same torsional wind-up components provide wind-up in both forward and reverse directions.

The invention also contemplates a method of providing torsional damping in a wind turbine drive system to reduce the magnitude and rapidity of torque reversals, and mitigate the resulting damaging impact loads on drive system components, comprising: detecting a drive system torque reversal exceeding a first preset threshold; dissipating torsional wind-up energy in the drive system while maintaining said reverse torque at said first preset threshold; detecting a positive torque exceeding a second preset threshold; and returning the turbine drive system to forward operation. The drive system operates in a forward direction producing electric power without affecting the system's basic forward torsional characteristics, while providing torsional damping in a reverse direction, and the referenced first threshold is set at less than 100% of the turbine torque at a power rating of the generator. Again, the torque reversal detection and dissipation of torsional wind-up is achieved automatically with frictional slipping, which effectively reduces the magnitude of reverse torque and slows the rate of the torque reversal magnitude increase.

In certain embodiments of the invention, the first and second preset thresholds are the same and the frictional slipping action is provided in parallel with torsional springs that deflect during normal forward operation such that the torque load and the turbine generator drive system is shared by both frictional slippage and spring deflection. The frictional slippage provides a hysteresis damping to a winding up and unwinding of the drive system components, the torsional springs preferably having a zero torque load deadband for at least a portion of a torsional displacement movement during a torque reversal and wherein additional reverse torsional deflection spring action occurs at an end of the deadband movement. There is provided an additional reverse torsional spring action that is symmetric to the forward torsional spring action, thus achieving bidirectional operation of the unit.

The invention also contemplates a method of retrofitting a wind turbine generator with torsional damping to reduce the magnitude and rapidity of torque reversals, comprising: removing the coupling hub on the generator shaft; installing a new coupling hub allowing the wind turbine generator drive system to operate in the forward direction producing electric power without affecting the system's basic forward torsional characteristics while providing torsional damping in the reverse direction by detecting a drive system torque reversal exceeding a preset threshold, dissipating torsional wind-up energy in the system while maintaining said reverse torque at said preset threshold, detecting a positive torque, and returning the turbine drive system to the forward operation; and selecting and installing an adapter plate to mate an existing coupling spacer.

DESCRIPTION OF DRAWINGS

For a complete understanding of the various aspects, structures and operation of the invention, reference should be made to the following detailed description and accompanying drawings wherein:

FIG. 9 is a view of the end plate showing the torque bolt holes, along with slots for movement and compression of the torsional wind-up springs and recesses for a Bellville spring;

FIG. 10 shows the friction plate with bonded friction material and openings for the compression-type spring that is used for the torsional wind-up, along with slots to allow the torque bolts to displace rotationally relative to the friction plate; and FIG. 11 is the pressure plate that fits into the endplate with zero backlash drive to transfer the torque between the two.

DETAILED DESCRIPTION OF PREFERRED EMBODIMENTS

Figure 1:
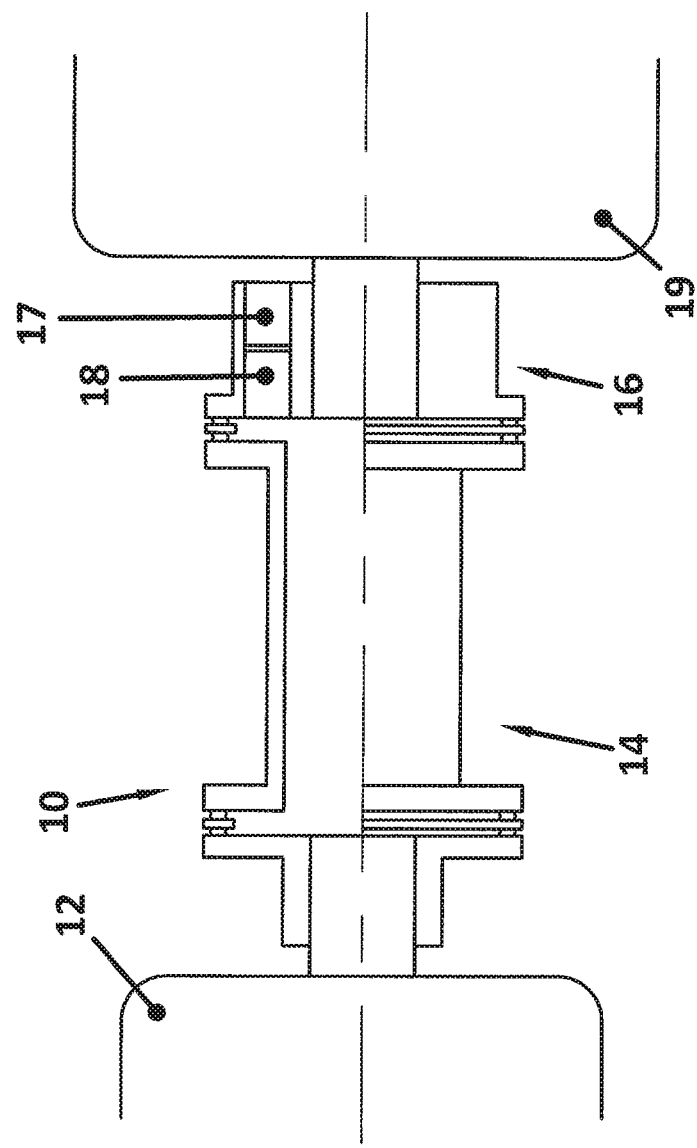
FIG. 1 is a functional schematic of a wind turbine coupling system between the gearbox and the generator particularly adapted as a retrofit for existing coupling systems.

Referring now to the drawings, and more particularly FIG. 1, it can be seen that a wind turbine coupling system between the gearbox output shaft and generator input shaft made in accordance with the prior art is designated generally by the numeral 10. The system includes a gearbox 12 coupled to the generator 19 by a spacer coupling 14. The instant invention 16 replaces the existing coupling hub on the generator shaft and adapts to the spacer of the existing coupling system. The drawing illustratively shows a frictional slip capability 17 in parallel with a torsional deflection and/or displacement capability 18.

Figure 2:
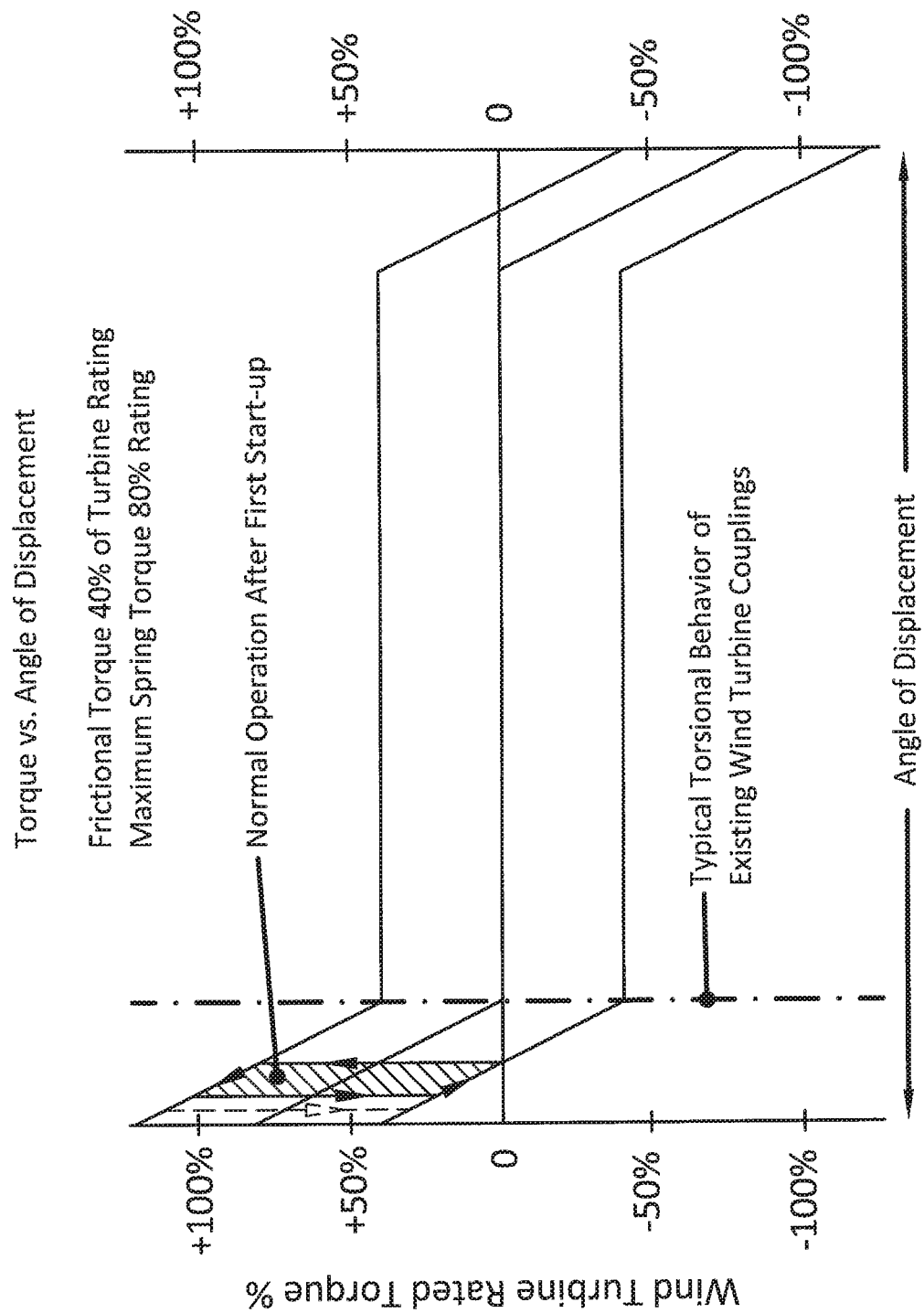
FIG. 2 is a graph of drive coupling torque as a percent of rated torque vs. angle of displacement for the present invention compared to the torsional rigidity of the typical existing coupling hub it replaces, indicated by the vertical dot-dash line, during normal operation.
Figure 3:
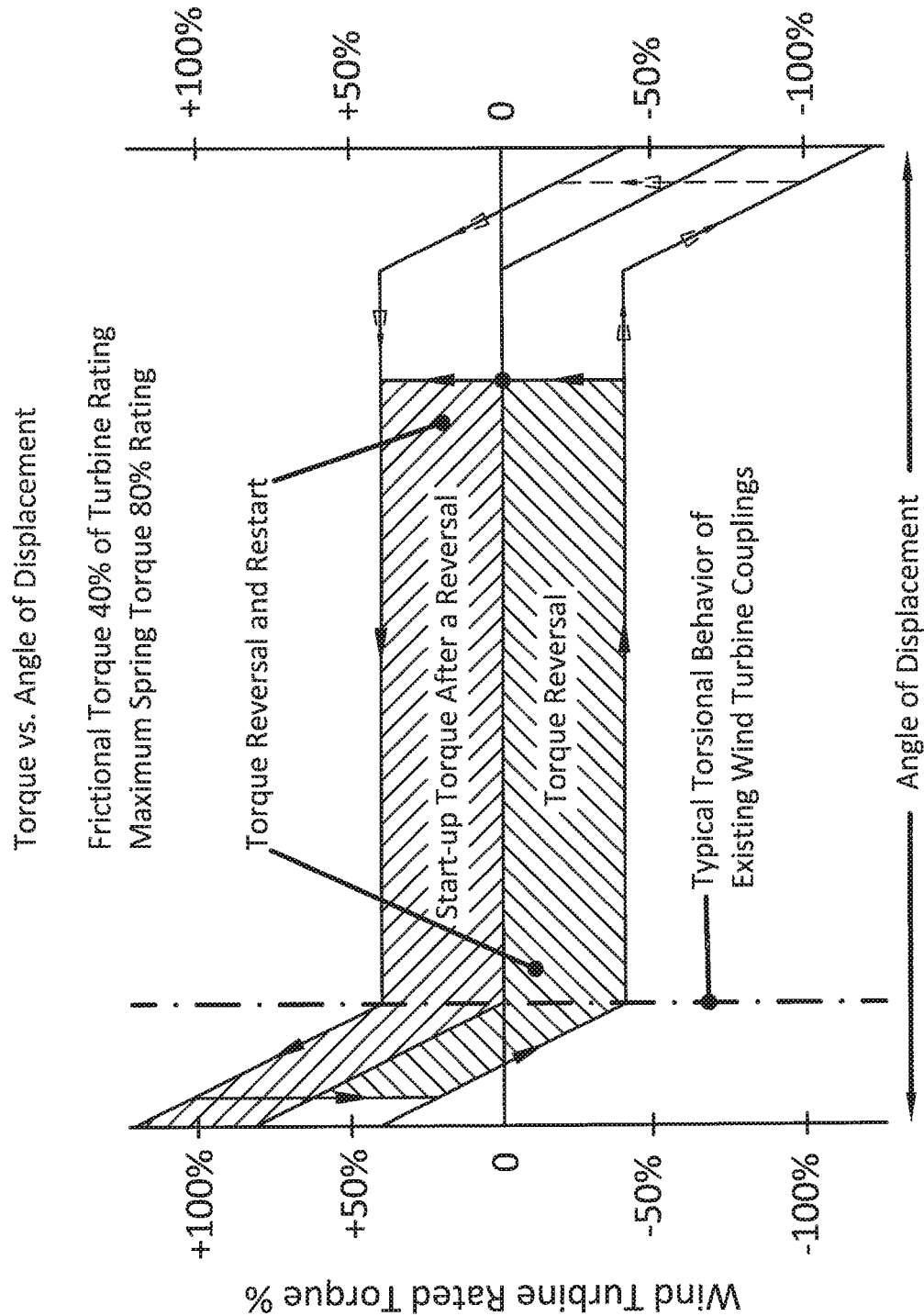
FIG. 3 is the same torque vs. angle of displacement graph as in FIG. 2, but shows the torque and displacement during a torque reversal and restart of the turbine, the torsional rigidity and zero backlash of existing coupling systems being shown with the dot-dash line.

With reference to FIG. 2, an appreciation can be obtained as to the torsional behavior of an existing wind turbine coupling hub compared to the torsional behavior of a preferred embodiment of the invention. The existing coupling hubs are characterized by torsional rigidity and zero backlash with virtually no useful torsional wind-up or angular displacement as shown with the near-vertical dot-dash line. In contradistinction, the preferred embodiment has a useful level of torsional wind-up (torque increasing with angular displacement) and/or some significant torsional displacement. In parallel with the torsional wind-up and/or displacement is a frictional slip capability preferably set to allow some slight torsional displacement during startup and shutdown. A slip setting of 40% of rated turbine torque is shown to allow this slight frictional slippage during startup and shutdown and thus keeping the frictional interface in optimum condition. FIG. 2 also shows a potential for large angular displacement, but it does not become active until a torque reversal, as shown in FIG. 3. Those skilled in the art can appreciate that a frictional slip setting that was much greater than 50% of rated turbine torque could prevent slippage in the forward direction. It could still function in the torsional reversal mode, which is a rare event in typical modern turbines and thus the friction interface would have to be well protected from corrosion and other frictional interface changes that could cause stick/slip behavior or an undesirable increase in its static torque slip release setting.

FIG. 3 shows the behavior of the preferred embodiment during a torque reversal exceeding the frictional torque setting threshold. It shows the effect of providing a large amount of angular displacement or backlash in conjunction with the torsional wind-up ability that is acting in parallel with the frictional slip ability. Torque reversals are known to cause load zone reversals on the gearbox bearings that result in the rollers impacting on the bearing raceways. This can lead to cracking and failing of the bearing races. By designing in a significant angular displacement, the frictional slippage can absorb most or all of the impact energy that could cause bearing damage. Most torque reversals occur during severe stopping events. FIG. 3 shows that upon restarting the turbine, a preferred embodiment automatically slips back into normal operation when the forward torque in the system exceeds the frictional slip threshold. The preferred embodiment also has a torsional wind-up ability at the end of the reverse angular displacement. This provides cushioning in case the amount of angular displacement designed is not enough to fully absorb the torque reversal energy. Some hard stops may also be designed in to limit the torsional wind-up and protect the torsional wind-up springs from damage.

Figure 4:
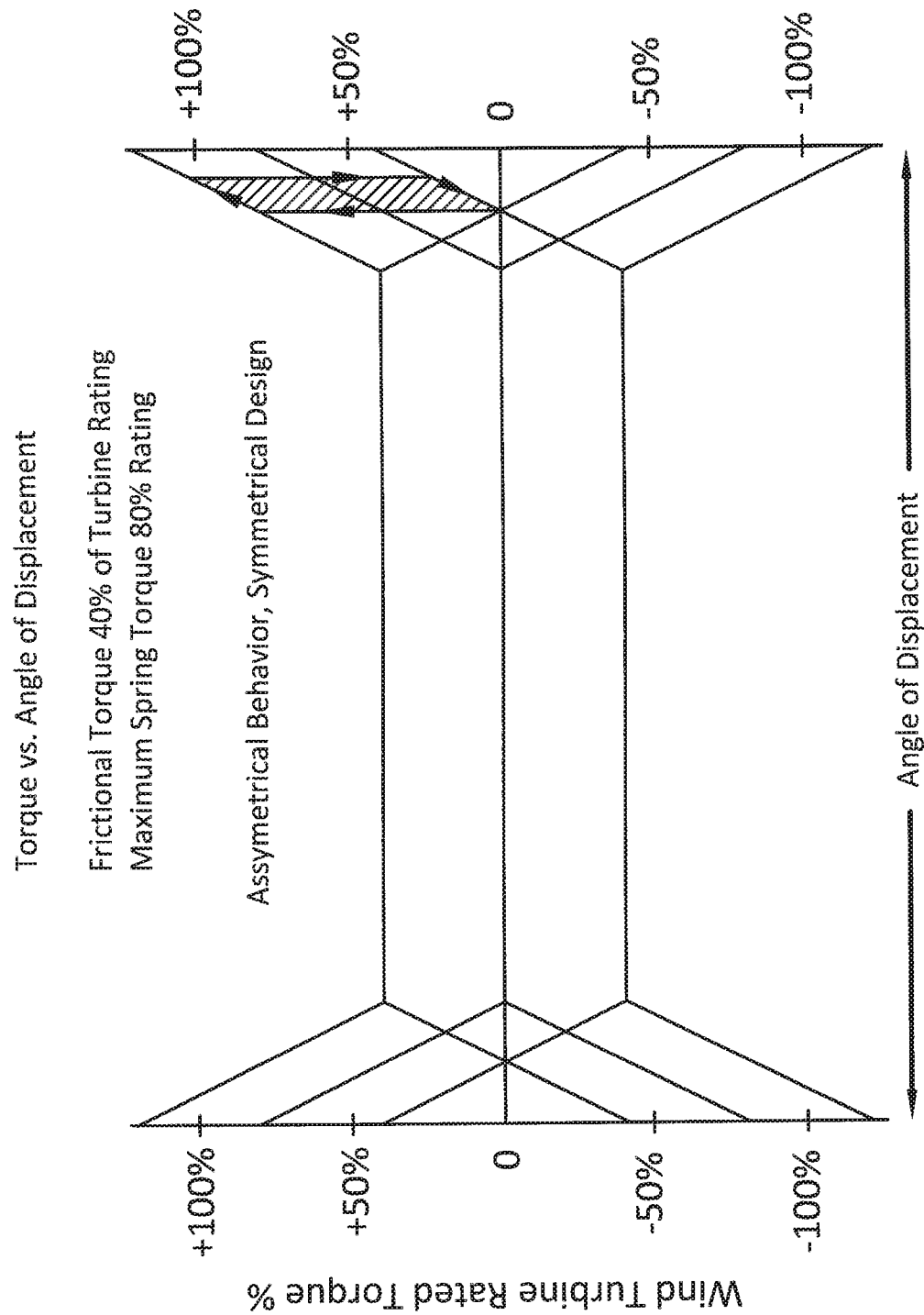
FIG. 4 is the same torque vs. angle of displacement graph as in FIGS. 2 and 3, but if the turbine were turning in the opposite direction of forward rotation, e.g. counter-clockwise vs. clockwise, demonstrating a symmetric design with asymmetric behavior.

FIG. 4 shows another reason to provide the torsional wind-up ability in reverse—the symmetry of the design. FIG. 4 is again the same FIGS. 2 and 3, but shows another advantage of designing the torsional wind-up ability into the reverse direction—the design becoming symmetrical so that the unit can operate the same whether the normal direction of rotation of the generator shaft is clockwise or counterclockwise. This eliminates the need to manufacture and stock two different units for the same size wind turbine that has different directions of rotation at the generator.

Figure 5:
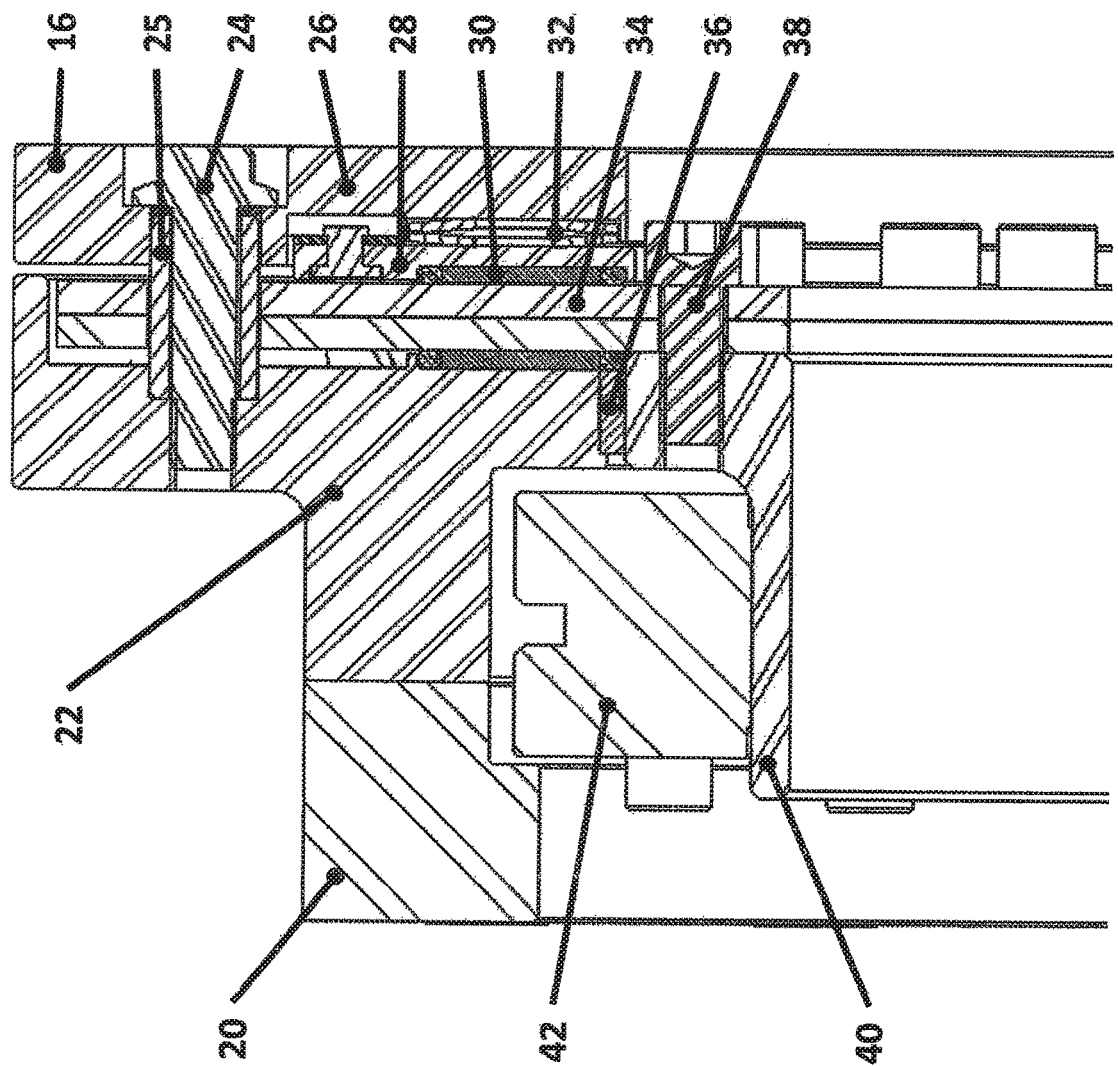
FIG. 5 is a cross-sectional view of the coupling adapted for implementation of the system.

Referring now to FIG. 5, an appreciation of the invention can be obtained from a sectional view that shows the details of the preferred embodiment. Adapter 20 connects the coupling spacer 14 to the input hub 22. Torque bolts 24 clamp the endplate 26 to the input hub 22 with spacing controlled by the bolt spacers 25. The endplate 26 retains the Belleville springs 32 that provide the necessary force on the pressure plate 28 against the friction material 30 to control the slip torque setting. The friction material is affixed to the friction plate 34, which is fixed to the output hub 40 with bolts 38. Bearing 36 maintains concentricity of the input to the output. A "shrink disc" shaft locking device 42 clamps the output to the generator shaft.

Figure 6:
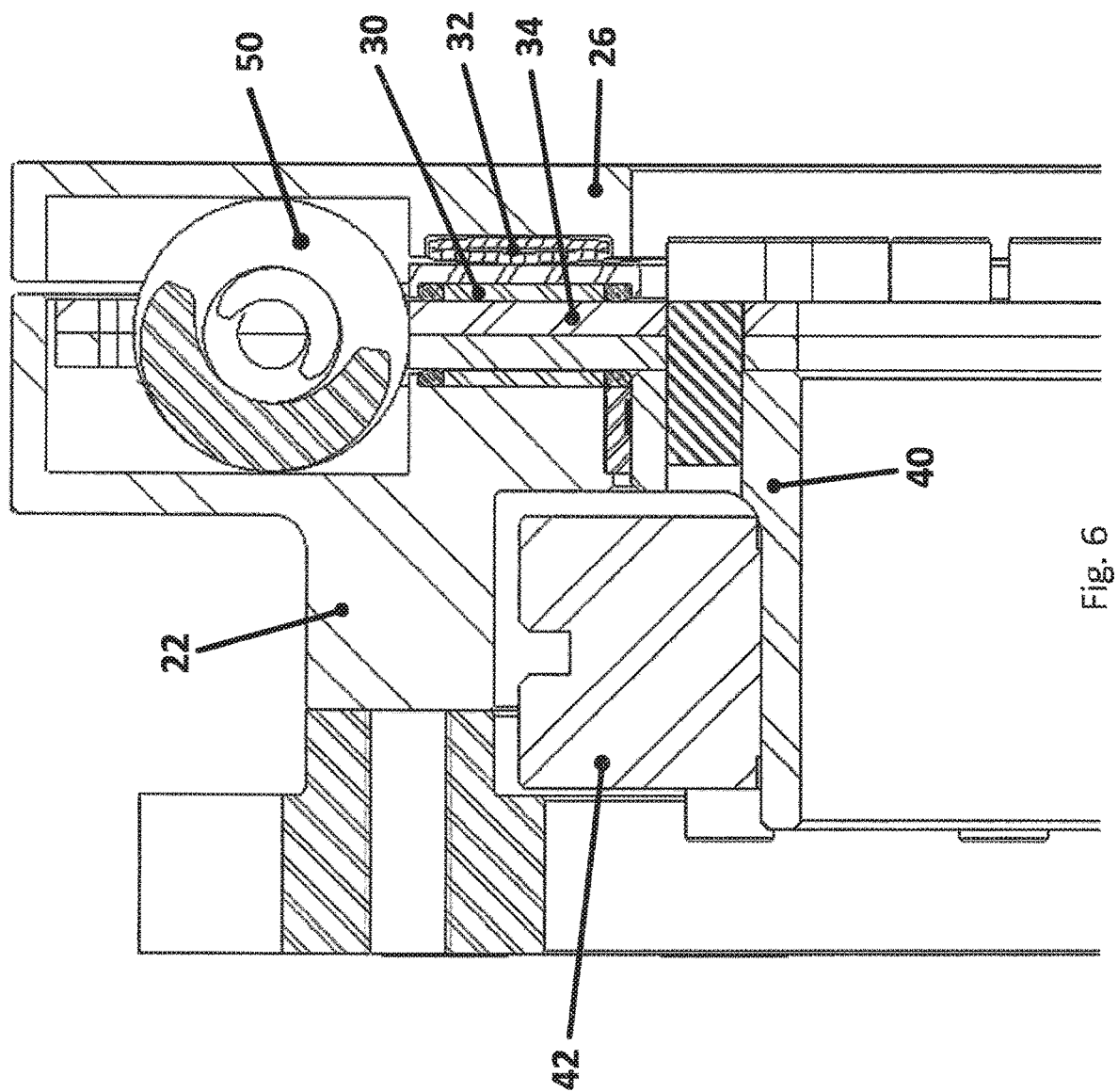
FIG. 6 is a cross sectional view of the coupling showing one of the compression springs that provides the torsional deflection.
Figure 7:
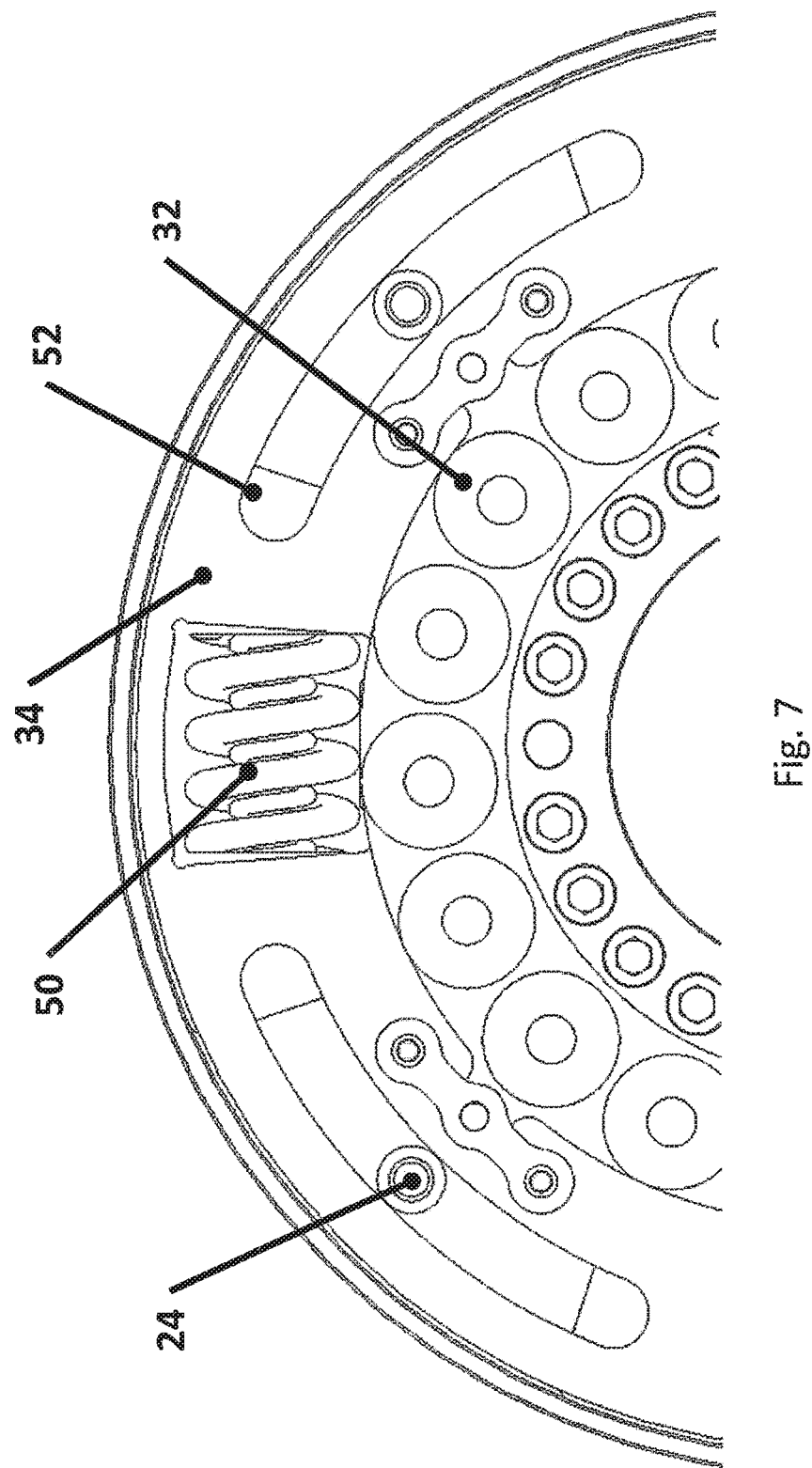
FIG. 7 is a sectional view of a coupling of the invention showing the compression springs for the torsional deflection, along with the slots for the torque bolts in the friction plate, and the Bellville springs for controlling the force on the friction elements.

FIG. 6 is a sectional view similar to FIG. 5 that shows one of a plurality of compression springs 50 that provides a means for torsional wind-up. FIG. 7 is a sectional end view showing one of the compression springs 50 compressed in the normal operating position with the torque bolts 24 near the end of travel in the slots 52 in frictional plate 34. The slot ends provide a hard stop against the torque bolts to protect the compression springs from being overstressed. A plurality of Belleville springs 32 is also shown. These provide the necessary axial force for the characteristic slip torque on the friction surfaces 30.

Figure 8:
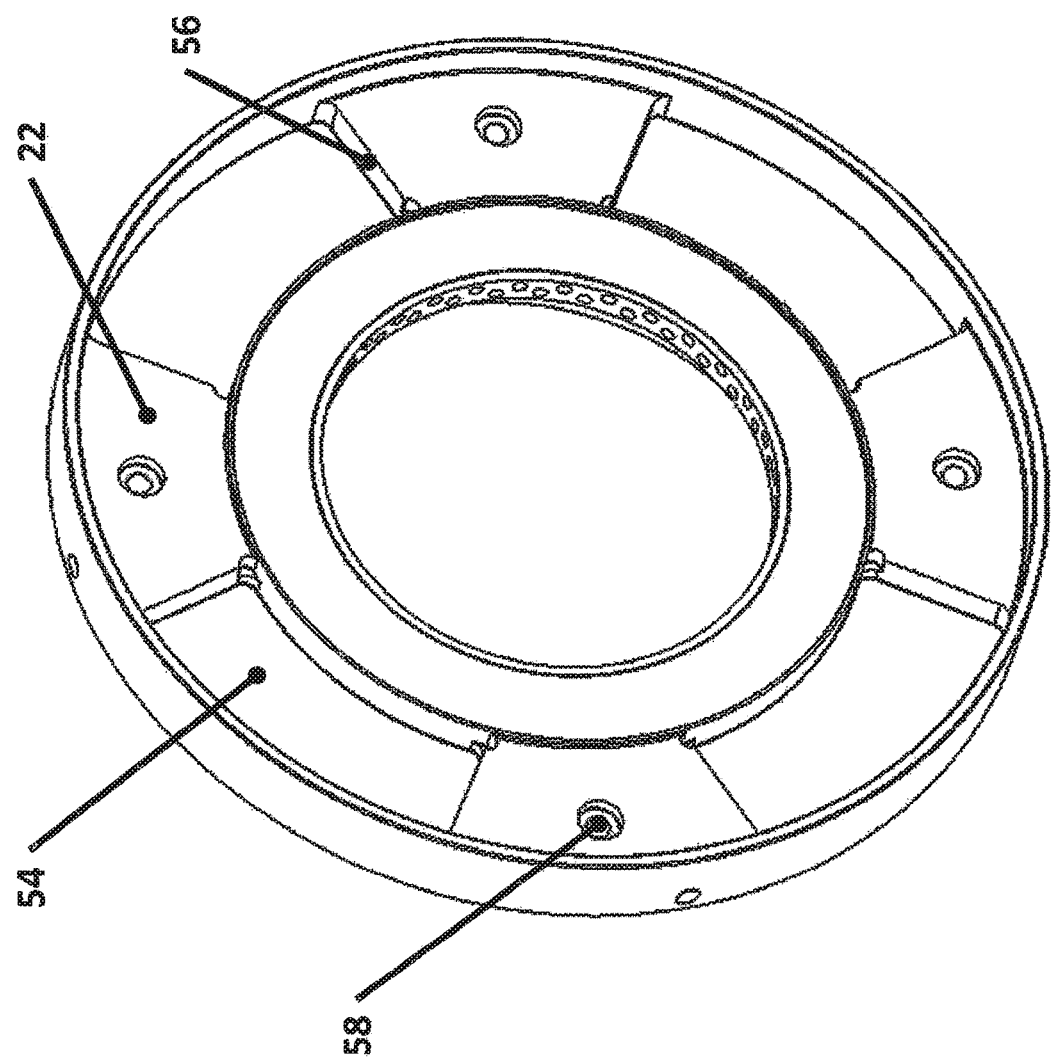
FIG. 8 is a view of the input hub showing the holes for the torque bolts and the slots to allow rotational travel of torsional wind-up compression springs without compression, along with the ends of the spring slots that provide for compression of the torsional wind-up springs at each end of travel.

FIG. 8 shows the details of the input hub 22 with holes 58 to accommodate the torque bolts 24. Slots 54 provide clearance for the compression springs 50 to allow rotational movement between the input and the output when the frictional torque threshold set by the Belleville springs 32 is exceeded. Slot ends 56 contact the compression springs 50 at the extremes of the angular displacement to provide the desired torsional wind-up capabilities at each end of the torsional displacement.

FIG. 9 is a view of the endplate 26 showing slots 60 matching the slots 54 for the rotational movement relative to the compression springs. Similar slot ends are also shown. Recesses 62 for the Belleville springs are also shown.

FIG. 10 is a view of the friction plate 34 showing slots 66 for relative movement of the torque bolts and openings 68 for containing the compression springs 50.

FIG. 11 is a view of the pressure plate 28 with tabs 70 shown as a means of carrying the torque to the endplate.

It is contemplated that various embodiments will typically have a combination of torsional wind-up and torsional displacement that will exceed 10 degrees and preferably be on the order of 20 to 60 degrees or greater for typical turbines with generators operating at 1000 rpm or more. For turbines with lower generator speeds, the required torsional displacement would be lower, in the range of 1 to 5 degrees per 100 rpm.

It is also contemplated that various embodiments will typically have a frictional torque setting exceeding 10% of the turbine torque so that normal turbine torque fluctuations do not cause unnecessary slippage and wear. The frictional torque setting would preferably be in the range of 20 to 50%, but could also be in excess of 50%. The most preferred setting would be 30 to 45% so as to provide a slight amount of slippage during normal startup and shutdown. That keeps the friction interface at its optimum performance during the rare torque reversal events that can damage the bearings.

Thus, it can be seen that the various aspects of the invention have been achieved by the structure presented and described above. While in accordance with the patent statutes, only the best known and preferred embodiment of the invention has been presented and described in detail, the invention is not limited thereto or thereby. Accordingly, for an appreciation of the true scope and breadth of the invention, reference should be made to the following claims.

What is claimed is:

1. In a wind turbine power generating system comprising a wind turbine connected to a speed-increasing gearbox having a high-speed output shaft and an electrical generator having an input shaft, the improvement comprising:
   a coupling system interconnecting said output and input shafts, a torque path of said coupling system being split between at least one of a torsional wind-up and displacement component along with a torsional dampening component;
   wherein the torsional damping component is a frictional slip component set in a forward direction to at least 10% of a rated turbine torque; and
   wherein a torsional rotational displacement movement in a reverse direction is taken from the group of at least 10 degrees or greater for turbines with generators operating at 1000 rpm or more and for turbines with lower generator speeds in a range of 1 to 5 degrees per 100 rpm.

2. The improvement in a wind turbine power generating system according to claim 1, wherein a frictional slip setting in a reverse driving direction is equal to at least 10% of the rated turbine torque.

3. The improvement in a wind turbine power generating system according to claim 1, further comprising a pressure plate and an endplate and wherein there is a zero backlash connection between the pressure plate and the endplate.

4. The improvement in a wind turbine power generating system according to claim 1, wherein a parallel wind-up and frictional slip are located on the generator shaft.

5. The improvement in a wind turbine power generating system according to claim 1, wherein an adapter plate is provided to fit an existing flexible coupling of a turbine for ease and safety of retrofitting.

6. The improvement in a wind turbine power generating system according to claim 1, wherein a portion of the torsional rotational displacement movement is frictional slip without torsional wind-up in forward or reverse.

7. The improvement in a wind turbine power generating system according to claim 6, wherein the frictional-slip portion is at least 10 degrees.

8. The improvement in a wind turbine power generating system according to claim 1, wherein there is a hard stop after a threshold of torque in a forward direction is exceeded.

9. The improvement in a wind turbine power generating system according to claim 8, wherein the threshold is above 120% of rated turbine torque.

10. The improvement in a wind turbine power generating system according to claim 1, wherein the torsional rotational displacement movement has an asymmetric action during operation such that the only time a deadband is engaged is during a torque reversal exceeding a frictional slip threshold.

11. The improvement in a wind turbine power generating system according to claim 10, wherein the asymmetric action is automatic.

12. The improvement in a wind turbine power generating system according to claim 10, wherein the frictional slip setting is greater than 20% of the rated turbine torque and less than 100%.

13. The improvement in a wind turbine power generating system according to claim 10, wherein the designs of the frictional slip and the wind-up elements are symmetric to allow for use on wind turbines which have gearbox designs that may either be clockwise or counterclockwise forward rotation.

14. The improvement in a wind turbine power generating system according to claim 1, wherein the coupling system is symmetrical in design and asymmetrical in its response to torque reversals with a prolonged slip ability in either direction of input shaft rotation.

15. The improvement in a wind turbine power generating system according to claim 1, wherein a slip torque setting is high enough to only occur during transient torsional events.

16. The improvement in a wind turbine power generating system according to claim 15, wherein the transient torsional events include torque reversals.

17. The improvement in a wind turbine power generating system according to claim 16, wherein the transient torsional events also include shutdowns and startups and recovering from said transient torsional events.

18. The improvement in a wind turbine power generating system according to claim 17, wherein the torsional movement during normal startup and shutdown is less than 10 degrees.

19. The improvement in a wind turbine power generating system according to claim 18, wherein the torsional movement during transient torque reversal that exceeds a frictional slip component setting is greater than 10 degrees.

\* \* \* \* \*